(12) United States Patent
Wietelmann et al.

(10) Patent No.: US 11,292,804 B2
(45) Date of Patent: Apr. 5, 2022

(54) HIGHLY REACTIVE METAL HYDRIDES, PROCESS FOR THEIR PREPARATION AND USE

(71) Applicant: Albemarle Germany GmbH, Frankfurt am Main (DE)

(72) Inventors: Ulrich Wietelmann, Friedrichsdorf (DE); Christopher Kurth, Bensheim (DE); Peter Rittmeyer, Sulzbach/Taunus (DE); Stefan Scherer, Griesheim (DE); Armin Stoll, Hirschberg an der Bergstraße (DE); Uwe Lischka, Frankfurt am Main (DE)

(73) Assignee: ALBEMARLE CORPORATION, Charlotte, NC (US)

( * ) Notice: Subject to any disclaimer, the term of this patent is extended or adjusted under 35 U.S.C. 154(b) by 0 days.

(21) Appl. No.: 16/601,154

(22) Filed: Oct. 14, 2019

(65) Prior Publication Data

US 2020/0040012 A1 Feb. 6, 2020

Related U.S. Application Data

(62) Division of application No. 15/563,229, filed as application No. PCT/EP2016/056535 on Mar. 24, 2016, now abandoned.

(30) Foreign Application Priority Data

Apr. 2, 2015 (DE) .......................... 102015206045.4
Apr. 16, 2015 (DE) .......................... 102015206894.3

(51) Int. Cl.
| | | |
|---|---|---|
| C07F 5/06 | (2006.01) | |
| C01B 6/04 | (2006.01) | |
| C07F 5/02 | (2006.01) | |
| C07F 1/02 | (2006.01) | |
| C07F 1/04 | (2006.01) | |
| C07F 3/02 | (2006.01) | |
| C01B 6/00 | (2006.01) | |

(52) U.S. Cl.
CPC .............. *C07F 5/069* (2013.01); *C01B 6/04* (2013.01); *C07F 1/02* (2013.01); *C07F 1/04* (2013.01); *C07F 3/02* (2013.01); *C07F 5/027* (2013.01); *C07F 5/066* (2013.01); *C01B 6/00* (2013.01)

(58) Field of Classification Search
None
See application file for complete search history.

(56) References Cited

U.S. PATENT DOCUMENTS

| | | | | |
|---|---|---|---|---|
| 3,591,339 A * | 7/1971 | Vit et al. | ................... | C01B 6/00 423/646 |
| 3,998,941 A | 12/1976 | Nelson | | |
| 4,045,545 A * | 8/1977 | Ashby | ..................... | C01B 6/243 423/644 |
| 4,327,071 A | 4/1982 | Chiu et al. | | |
| 4,396,589 A | 8/1983 | Bogdanovic | | |
| 4,554,153 A * | 11/1985 | Bogdanovic | .......... | B82Y 30/00 420/900 |
| 2003/0053948 A1 | 3/2003 | Bogdanovic et al. | | |
| 2012/0288753 A1* | 11/2012 | Wietelmann | ........... | H01M 4/38 429/188 |

FOREIGN PATENT DOCUMENTS

| | | |
|---|---|---|
| EP | 0003564 B1 | 8/1979 |
| EP | 0685425 A1 | 12/1995 |

OTHER PUBLICATIONS

Peter A. Klusener, et al., Superactive Alkali Metal Hydride Metalation Reagants: LiH, NaH, and KH, Angew Chem. Int. Ed. Engl. 25, 1986, pp. 465-466, No. 5, Weinheim, Germany.
Yiping Zhang, et al., Highly Active Alkali Metal Hydrides; Their Catalytic Syntheses and Properties, Journal of Molecular Catalysis, 84, 1993, pp. 211-221, Elsevier Science Publishers, B.V., Amsterdam.
Borislov Bogdanovic, et al., Dioganomagnesium Compounds from Magnesium, Hydrogen, and 1-Alkenes and Their Application in Synthesis, Jun. 1993, pp. 1371-1383, vol. 125, Issue 6, Chemische Berichte, Weinheim.
Eric J. Hukkanen, et al.. Measurement of Particle Size Distribution in Suspension Polymerization Using in Situ Laser Backscattering, Sensors and Actuators B 96, 2003, pp. 451-459, Science Direct.
Terry Redman, et al.. Advancing Beyond Turbidity: Selecting Appropriate Technology for Monitoring and Control of Complex Particle and Droplet Systems, Technical Guide: In-Process Particle Characterization of Suspensions and Emulsions, 2009, pp. 1-14, Mettler-Toledo AutoChem, Inc., Columbia, Maryland.

\* cited by examiner

*Primary Examiner* — Clinton A Brooks
(74) *Attorney, Agent, or Firm* — Troy S. Kleckley; Nathan C. Dunn

(57) ABSTRACT

The invention relates to powdery, highly reactive alkali and alkaline earth hydride compounds, and to mixtures with elements of the third main group of the periodic table of elements (PTE) and to the preparation thereof by reacting alkali or alkaline earth metals in the presence of finely dispersed metals or compounds of the third main group of the PTE, wherein the latter have one or more hydride ligands or said hydride ligands are converted in situ, under the prevailing reaction conditions, i.e., in the presence of hydrogen gas or another H source, into hydride species, and to the use thereof for the preparation of complex hydrides and organometallic compounds.

6 Claims, No Drawings

HIGHLY REACTIVE METAL HYDRIDES, PROCESS FOR THEIR PREPARATION AND USE

REFERENCE TO RELATED APPLICATIONS

This application is a divisional of U.S. application Ser. No. 15/263,229, filed on Feb. 21, 2018, which is the National Stage of International Patent Application PCT/EP2016/056535, filed on Mar. 24, 2016, which in turn claims benefit of German Application No. 102015206045.4, filed on Apr. 2, 2015, and German Patent Application No. 102015206894.3, filed on Apr. 16, 2015, the disclosures of which are incorporated herein by reference.

TECHNICAL FIELD

The subject matter of the present patent specification relates to a powdery, highly reactive alkali and alkaline earth hydride compounds and to mixtures with elements of the 3rd main group of the periodic table of elements (PTE) and to the preparation thereof by reacting alkali or alkaline earth metals in the presence of finely dispersed metals or compounds of the third main group of the PTE, wherein the latter have one or more hydride ligands or said hydride ligands are converted in situ, under the prevailing reaction conditions, i.e., in the presence of hydrogen gas or another H source, into hydride species, and to the use thereof for the preparation of complex hydrides and organometal hydrides.

BACKGROUND

The hydrides of the metals of the 1st and 2nd group of the PTE belong to the salt-type ionic compounds and are prepared as a rule by reacting the metal in question with hydrogen at elevated temperatures and under hydrogen atmosphere (P. Rittmeyer, U. Wietelmann, Ullmann's Encyclopedia of Industrial Chemistry, VCH Weinheim, Vol. A 13, 1989). Thus, the highly stable lithium hydride is synthesized at 700-900° C. under 1 bar hydrogen atmosphere in the melt. After the completed reaction, the melt is cooled and the solidified hydride is broken and ground. Sodium hydride is also produced in the molten state in a high boiling oil at 250-300° C. under hydrogen. Magnesium hydride is synthesized from powdery magnesium at 300-400° C. under an $H_2$ pressure of 100-150 bar.

The metal hydride powders prepared in this manner have a relatively low reactivity, i.e., they have only relatively low alkaline properties (P. A. A. Klusener, L. Brandsma, H. D. Verkruijsse, P. v. Rague Schleyer, T. Friedl, R. Pi, Angew. Chem. 98 (1986), 458-9) and they are not suitable or poorly suitable, for example, for the hydride transfer on Lewis acids of the type R3B (R=sterically hindered alkyl groups, for example, sec-butyl). This applies particularly to lithium hydride. To be able to use commercial lithium hydride, for example, for the preparation of lithium tri-sec-butylborohydride from tri-sec-butylborane (B(secBu)s), a catalyst is needed, for example, a metal amino borohydride. However, at room temperature (RT), relatively long reaction times (EP 1272496 B1, 700 minutes, see Example 5) are necessary for a completed reaction. Moreover, it is known to prepare alkali metal triple alkyl-substituted borohydride compounds $M[R^1R^2R^3BH]$ from an alkali metal, a hydrogen donor and a triple alkyl-substituted borane. The hydrogen donor is preferably selected from the group consisting of hydrogen, deuterium, tritium, ether, cyclohexadiene, cyclohexene. In the case of an alkali metal, except for potassium, the presence of a transition metal catalyst (for example, FeCb) and/or of a polycyclic aromatic compound (for example, naphthalene, phenanthrene) is necessary (U.S. Pat. No. 5,886,229). Here, it is disadvantageous that the solution of product formed is contaminated by these catalysts or the degradation products thereof.

Moreover, highly reactive alkali metal hydride reagents ($MH_n^*$) have been reported to be quite usable for metalation reactions. The highly reactive variant of the respective metal hydride ($MH_n^*$) or metal ($M^{2*}$) is marked using superscript asterisks ("*"). The preparation of such reagents was described for M=Li in a review article (U. Wietelmann, *Lithium Hydride, Lithium Halides, LiO and LiS—Compounds*, Science of Synthesis (Houben-Weyl, Methods of Molecular Transformations), Vol. 8, chap. 8.1.2-8.1.5, 2006). As a rule, the preparation of such reactive hydride species starts with expensive raw materials (for example, butyllithium—n-BuLi in N,N,N',N'-tetramethylethylenediamine—TMEDA), wherefore such products have no commercial relevance. The most important preparation route consists of the hydrogenolysis of n-BuLi/TMEDA by means of hydrogen or 1,3-cyclohexadiene (P. A. A. Klusener, L. Brandsma, H. D. Verkruijsse, P. v. Rague Schleyer, T. Friedl, R. Pi, Angew. Chem. 98 (1986), 458-9):

$$C_4H_9Li/TMEDA + H_2 \rightarrow C_4H_{10} + LiH^* \downarrow + TMEDA \qquad (1)$$

Moreover, there is a report on the synthesis of active alkali metal hydride compounds of the elements Li, Na and K by reacting alkali metal in pieces in tetrahydrofuran (THF) at 40° C. in the presence of a catalyst combination consisting of a transition metal compound, for example, $TiCl_4$ and naphthalene under hydrogen atmosphere (Y. Zhang, S. Liao, Y. Xu, J. Mol. Cat. 84 (1993) 211-221). The NaH* produced in this manner could be used for the dehalogenation of bromobenzene and chloride benzene in boiling THF. Moreover, in the presence of various transition metal catalysts, LiH* and NaH* can be used for reducing hexene to hexane. The disadvantage of the last-mentioned synthesis variant is that the synthesis mixtures formed are contaminated with a combination of transition metals and naphthalene.

Since commercial magnesium hydride is insufficiently reactive to be usable for syntheses of, for example, dialkyl magnesium compounds by hydromagnesation of olefins, attempts have been made to prepare it in a more reactive form. Active magnesium hydride can be prepared by high-pressure hydrogenation of Grignard compounds at higher temperatures (71-150° C., 350 bar) according to $$2RMgX + 2H_2 \rightarrow 2RH + MgX_2 + MgH_2^* \qquad (2)$$

(W. E. Becker, E. C. Ashby, J. Org. Chem. 29, 954 (1964)). In a similar manner, dialkylmagnesium compounds, for example, dibutylmagnesium, can also be converted by high-pressure hydrogenolysis (5 MPa) at 200° C. into $MgH_2^*$ (E. J. Setijadi, C. Boyer, Phys. Chem. Chem. Phys. 2012, 14, 11386-97). Due to the unfavorable conditions, the expensive Mg sources, and, in the case of the Grignard compounds, the unavoidable contamination with magnesium halides ($MgX_2$), this $MgH_2^*$ formation method has not gained importance.

Moreover, a method has been described for preparing highly reactive magnesium hydride by hydrogenation of Mg metal in a THF suspension and in the presence of a chromium-containing homogenous catalyst (B. Bogdanovic, P. Bons, S. Konstantinovic, M. Schwickardi, U. Westeppe, Chem. Ber. 1993, 126, 1371-83; U.S. Pat. No. 4,554,153 A1). The THF-soluble catalyst consists of a $CrCl_3$/Mg-anthracene complex. The hydrogenation runs only under high-pressure conditions (for example, 80 bar). The active magnesium hydride $MgH_2^*$ prepared in this manner is reacted with an olefin in the presence of a transition metal catalyst, which is a halogen compound of metals of subgroups IV to VIII of the PTE, preferably in THF in the temperature range of 0 to 200° C. and at a pressure of 1 to 300 bar. According to the document EP 0014983 B1, dialkylmagnesium compounds are obtained with moderate to very good yields as solutions in THF. Due to the use of toxic chromium compounds and the necessarily high hydrogen pressures in the $MgH_2^*$ preparation, this synthesis variant is also disadvantageous.

From the document EP 514707 B1, another process is known, in which magnesium hydride is activated, before or during the reaction with an olefin, by grinding to a particle size of ≤10 μm, preferably ≤1 μm without the addition of complex catalysts. In the reaction with the olefin in an ether solvent, preferably THF or diglyme, a transition metal halide according to EP 0014983 B1 is added as catalyst. The disadvantage is that the yields of dialkylmagnesium compounds are as a rule low (25-34%).

INVENTION

The object of the invention is to indicate a process which, starting with inexpensive, commercially available raw materials, under mild conditions and without the use of toxic transition metal catalysts (for example, chromium), enables the synthesis of reactive metal hydrides ($MH_n^*$) of the 1st and 2nd group of the periodic table. In addition, the hydrides should be produced as directly as possible in a form useful for synthesis purposes (i.e., as powder or dispersions in a solvent) and have a sufficiently high reactivity so that they have a broad synthesis application range, that is to say they are capable of

- addition to Lewis acids such as trialkylboranes
- addition to olefinic compounds (also for hydrometalation), and
- deprotonation of acid compounds (for example, CH acids).

According to the invention, the object is achieved in that metals M of the first or second period of the PTE are reacted with a compound of general formula $M^1_x[M^2H_{3+x}]_b$ under inert gas (preferably argon according to Eq. 3) or optionally in the presence of hydrogen gas or another source of hydrogen, and in the presence of a finely dispersed reactive metal of the third main PTE group ($M^{2*}$) or of a compound with the more broadly written general formula $M^1_x[M^2(A^1_yA^2_z)_{3+x}]_b$ according to (eq. 4)

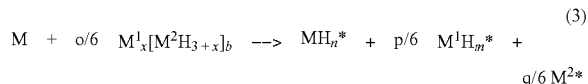
(3)

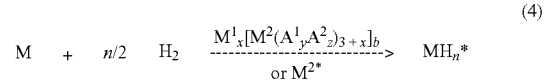
(4)

Here:
$M^1$=an alkali metal (Li, Na, K, Rb, Cs), an alkaline earth metal (Be, Mg, Ca, Sr, Ba) or (applicable only to Eq. 4) an element from the group of the rare earths (Sc, Y, La, Ce, Pr, Nd, Pm, Eu, Gd, Tb, Dy, Ho, Er, Tm, Yb, Lu); x=0 or 1;

$M^2$=an element of the 3rd main group of the PTE selected from the B, Al, Ga, In;
n=1 or 2, corresponding to the valence of the metal M;
b=the valence of $M^1$.

Moreover, in the case of equation (3):
m=1 or 2, corresponding to the valence of the metal $M^1$;
and in the case in which x=0, p=0, and
for M=alkali element, o and q=2, and
for M=alkaline earth element, o and q=4;
in the case in which x=1:
for M and $M^1$=alkali metals, the factors o, p, q=2;
for M and $M^1$=alkaline earth metals, the factors o, p=1, and q=2;
for M=alkali metal and $M^1$=alkaline earth metal, the factors o, p=2 and q=4, and
for M=alkaline earth metal and $M^1$=alkali metal, the factors o, p, q=4.

In addition, for equation (4):
$A^1$=H or an alkyl group containing 1-18 C atoms, wherein the up to four A groups can be identical or different;
$A^2$=an alkoxy residue (OR with R=alkyl with 1-8 C atoms), a dialkylamino residue ($NR_2$ with R=alkyl with 1-8 C atoms) or a halogen from Cl, Br, I, and
y can assume the value 1, 2 or 3, wherein y+z=3.

In the absence of a hydrogen source, $A^1$ and $A^2$ can only mean H, i.e., the reaction occurs exclusively according to Eq. (3). A suspension then forms, which contains a highly reactive metal hydride $MH_n^*$ in the mixture with q/6 equivalents (eq.) of highly reactive metal $M^{2*}$ and p/6 of highly reactive metal hydride $M^1H_m^*$. If, for the subsequent reactions (Eq. 7-9), pure metal hydride products, i.e., metal hydride products containing only a metal cation (except for the metal $M^2$), are desirable, it is preferable that $M^1$ and M are identical. For example, the combinations $LiAlH_4$ and Li or $NaAlH_4$ and Na are particularly preferable. For the case in which x=0, which is also particularly preferable, one necessarily obtains, with regard to the cation, directly pure metal hydride products $MH_n^*$. As an example for a particularly preferred combination, the preparation of active lithium hydride, LiH*, using $LiAlH_4$, is shown:

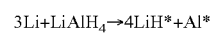

Under hydrogen atmosphere, $LiAlH_4$ can be used in catalytic quantities:

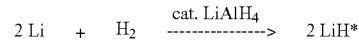

The mixtures of highly reactive metal $M^{2*}$ and of the highly reactive metal hydride $MH_n^*$, which are prepared according to the invention, can be used directly as suspensions for subsequent reactions. It is also possible to remove the solvent largely or completely and thus prepare highly reactive powdery mixtures of $M^{2*}$ and $MH_n^*$. The solvent-free, highly reactive products, when in contact with air, turn out to be pyrophoric and consequently have to be handled exclusively in a vacuum or under inert gas conditions (preferably under argon).

Reaction equation (4) applies to the case of an approximately stoichiometrically introduced hydrogen quantity; in the case of a hypostoichiometric reaction procedure or in the case of insufficiently long reaction times, elemental or only partially hydrogenated metal $M^2$ can remain. In the presence of elemental hydrogen or a source for hydrogen, the compound $M^1_x[M^2(A^1_yA^2_z)_{3+x}]_b$ is needed only in catalytic quantities. The compound $M^1_x[M^2(A^1_yA^2_z)_{3+x}]_b$ is used in catalytic quantities from 0.001 to 20 mol %, preferably from 0.01 to 10 mol %, with respect to the metal M. Under the respective reaction conditions, it can be converted into a related species. For example, if AlH$_3$ is used, then, after the reaction according to (4) has taken place in the presence of equimolar or excess H$_2$ quantities, M[AlH$_4$]$_n$ can be present. However, if elemental M is still present (meaning that, for example, due to a lack of H$_2$, not all the M has been converted to MH$_n$*), the aluminum introduced in the form of AlH$_3$ will be at least partially in elemental form.

It is also possible to achieve the desired metal hydride formation in the presence of the elemental metal M$^2$ and hydrogen, wherein M$^2$ is used in catalytic quantities from 0.001 to 20 mol %, preferably from 0.01 to 10 mol %, with respect to the metal M:

(5)

This reaction procedure requires the use of a highly reactive metal grade M$^{2*}$, preferably finely dispersed or amorphous aluminum. The highly reactive M$^2$ must have a mean particle size D$_{50}$ between 0.01 and 100 μm and it must not be affected by previous contact with air, oxygen, moisture and other reactive substances with regard to its reactivity. Alternatively, an industrial available metal grade, for example, aluminum metal powder or aluminum metal shavings, can also be used. However, such materials are not easily hydrogenated and require the addition of transition metal catalysts (for example, Ti, V, Fe) and/or high H$_2$ pressures (at least 10, preferably at least 50 bar). Since very fine/amorphous metal powders are not commercially available and high-pressure installations are relatively cost intensive, this variant is less preferable. It is thus simpler and more cost effective to use, as hydrogen transfer auxiliaries, the compounds represented by the generic formula M$^1_x$[M$^2$(A$^1_y$A$^2_z$)$_{3+x}$]$_b$ in catalytic quantities.

It was found surprisingly that the hydrogenation of M in the presence of finely dispersed, highly reactive metal M$^{2*}$ and/or compounds of general generic formula M$^1_x$[M$^2$(A$^1_y$A$^2_z$)$_{3+x}$]$_b$ under hydrogen atmosphere or in the presence of another hydrogen source succeeds under mild conditions with high yield. The prerequisite is that the metal M has a more negative standard potential than the metal M$^2$. Below, the respective standard potentials are compiled (D. R. Lide, Handbook of Chemistry and Physics 83$^{rd}$ ed., 2002-2003):

| 1st main group M= | Normal potential (V) | 2nd main group M= | Normal potential (V) | 3rd main group M$^2$= | Normal potential (V) |
|---|---|---|---|---|---|
| Li | −3.0401 | Be | −1.847 | B | no value |
| Na | −2.71 | Mg | −2.372 | Al | −1.662 |
| K | −2.931 | Ca | −2.868 | Ga | −0.539 |
| Rb | −2.98 | Sr | −2.899 | In | −0.3382 |
| Cs | −3.026 | Ba | −2.912 | | |

It is assumed that the hydrogen of M$^2$-H compounds is transferred to the base metals M and that the driving force of the reaction consists in the formation of the thermodynamically more stable hydride(s). Due to the dehydrogenation of M$^1_x$[M$^2$(A$^1_y$A$^2_z$)$_{3+x}$]$_b$, elemental M$^{2*}$ forms; the latter is present in an extremely reactive (finely dispersed: in part amorphous form), and it is very reactive with respect to, for example, hydrogen, i.e., it is rehydrogenated in the presence of the metal M and of a hydrogen source. On this backdrop, it is understandable that the use of M$^1_x$[M$^2$(A$^1_y$A$^2_z$)$_{3+x}$]$_b$ or of highly reactive/activated elemental M$^{2*}$ in catalytic quantities is sufficient.

As stoichiometric hydrogenation agents or hydrogenation catalysts, it is preferable to use compounds of aluminum M$^1_x$[Al(A$^1_y$A$^2_z$)$_{3+x}$]$_b$ or highly reactive/activated aluminum metal Al*. In particular, the alkali alanates LiAlH$_4$ and NaAlH$_4$, which are prepared on the industrial scale, are particularly suitable. Alane AlH$_3$ can also be used with equal success.

It was surprisingly found that certain non-hydride compounds of general formula M$^1_x$[M$^2$(A$^1_y$A$^2_z$)$_{3+x}$]$_b$ can also be used (thus such compounds in which neither A$^1$ nor A$^2$=H), when the hydrogen is supplied in elemental form (H$_2$) or in molecularly stored form (for example, as 1,3-cyclohexadiene). Without being bound to the correctness of the hypothesis, it is assumed that, under hydrogenation conditions, a reactive form of the metal M$^{2*}$ or an alloy consisting of M$^{2*}$ and M forms, which can take up hydrogen and transfer it in a subsequent step to the base metal M. This is explained using the example of the industrially available aluminum alkyls (that is to say, M$^2$=Al). For example, if triethylaluminum is reacted with elemental lithium in a THF suspension, then the formation of black, finely dispersed aluminum is observed, while the lithium dissolves at least partially:

(6)

(6a)

(6b)

The finely dispersed Al* or a forming reactive Al alloy reacts readily with hydrogen to form aluminum-containing hydrides, for example, AlH$_3$. The latter in turn can transfer the hydrogen under mild conditions to base metals M. Similarly, by the reaction of AlCl$_3$ in ether solutions by reaction with, for example, lithium metal, reactive elemental aluminum metal forms in addition to LiAlCl$_4$. The aluminates such as Li[AlEt$_4$] can react with hydrogen to form hydride-containing species.

The hydrogenation of the metals M according to equations (3)-(5) is carried out preferably in the presence of an anhydrous organic solvent. Suitable as such a solvent are ethers (open-chain or cyclic, such as diethyl ether, 1,2-dimethoxyethane, diethylene glycol dimethyl ether, tetrahydrofuran, 2-methyl tetrahydrofuran, tetrahydropyrane, dioxane, dioxolane and others), tertiary amines (triethylamine, tributylamine, morpholine, etc.), hydrocarbons (saturated C$_4$-C$_{18}$, preferably pentanes, hexanes, heptanes, octanes, etc.; aromatic compounds such as benzene, toluene, ethylbenzene, xylenes, cumene, etc.) in pure form or as any mixtures of at least two of the solvents listed. However, in principle it is also possible to carry out the hydrogenations without solvent. Thus, a liquid K/Na alloy already reacts at room temperature with complex alanates, for example, LiAlH$_4$. However, since such a reaction procedure is difficult to control, this process variant is less preferable.

The reaction temperatures can vary within broad limits, as a rule they are between −20 and 150° C., preferably 0 and 100° C., and particularly preferably between 25 and 70° C. If a reaction procedure according to (4) or (5) is intended, then contact with elemental hydrogen must be ensured. Frequently an unpressurized mode of operation is sufficient; however, in order to achieve the shortest reaction times possible, it is possible to work under H$_2$ pressure conditions. Preferably, the H$_2$ excess pressure is 2-300 bar, particularly preferably 10-100 bar. It is also possible to use, as hydrogen source, a compound which releases hydrogen under selected operating conditions. Examples of this are: 1,3-cyclohexadiene, decalin, N-ethylcarbazole.

As hydrogenation auxiliaries $M^1_x[M^2(A^1_y A^2_z)_{3+x}]_b$, metal hydride aluminates, for example, $LiAlH_4$, $NaAlH_4$, $KAlH_4$ and/or alane $AlH_3$ are preferably used. However, mixed alanates such as $Na[H_2Al(O(CH_2)2OCH_3)_2]$, $Na[H_2Al(C_2H_5)_2]$ or mixed alanes such as $HAl(C_4H_9)_2$ or $H_2AlC_4H_9$ can also be used. In the presence of an independent hydrogen source, trialkylalanes such as $Al(CH_3)_3$, $Al(C_2H_5)_3$, $Al(C_4H_9)_3$, sesquialanes such as $Et_{3-x}AlCl_3$ (x=1 to 3) or aluminum halides such as $AlCl_3$ or $AlBr_3$ are suitable.

The products according to the invention are produced in finely dispersed, in part nano-scale form. They are extremely reactive with respect to air and water, frequently even pyrophoric (i.e., they ignite spontaneously when air enters). Consequently, they have to be handled and stored with exclusion of reactive gases, i.e., in a vacuum, under nitrogen or inert gas atmosphere. The products according to the invention consist mainly of the highly reactive metal hydride $MH_n*$ and, depending on reaction management (Eq. 3 or 4 or an intermediate case), they contain different quantities of $M^{2*}$ and $M^1H_m*$. The molar ratio between $MH_n*$, $M^{2*}$ and $M^1H_m*$ is 1:0.001 to q/6:0 to p/6, preferably 1:0.01 to q/6:0 to p/6.

In a particularly preferred embodiment type, the metal hydrogenations are carried out according to Equations (3)-(5) in the presence of Lewis acids or unsaturated compounds that can be hydrometalated. These compounds are subsumed below under the term $MH_n*$ acceptors.

In this manner, selectively acting metal hydride reagents or organometallic compounds of the metals M, usable, for example, for synthesis purposes, can be obtained directly and conveniently. In addition, one avoids the manipulation and isolation of the extremely sensitive pyrophoric metal hydride solid substances. The following reaction diagrams can be used as examples of such a reaction procedure:

(7)

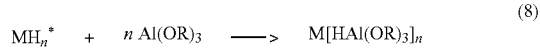

(8)

(9)

The residues R, $R^1$, $R^2$, $R^3$, $R^4$ are any unbranched, cyclic or branched alkyl groups containing 1 to 12 C atoms.

As $MH_n*$ acceptors the following compounds can be used above all:

preferable raw materials R3B for (Eq. 7) are: tri-sec-butylborane, trisiamylborane, tricyclohexylborane, preferred raw materials Al(OR)3 for (Eq. 8) are: aluminum trimethylate, aluminum tri(tert-butylate), aluminum tri(tert-pentylate), and preferred olefins for (Eq. 9) are olefins with $R^1$, $R^2$ and $R^3$=H, i.e., a-olefins, particularly preferably 1-propene, 1-butene, 1-pentene, 1-hexene, 1-heptene, 1-octene. Moreover, olefins with $R^2$ and $R^4$=alkyl groups containing 1-12 C atoms can be used. Under certain conditions, olefins with internalized double bonds, for example, 2-butene, 2-pentene, 2-hexene, 2-heptene, 2-octene, 2-decene can also be accessed by the hydrolithiation reaction according to the invention.

For carrying out the in situ utilization reactions of the highly reactive metal hydrides $MH_n*$, several particular process variants exist, for example:

Variant A: the $MH_n*$ acceptor is added partially or completely before the start of the metal hydride formation to the mixture of the metal powder M and an aprotic solvent or solvent mixture. Then, the reagent $M^1_x[M^2(A^1_y A^2_z)_{3+x}]_b$ used for the H transfer is added in stoichiometric quantity or as a catalyst. In the latter case, the reaction mixture is moreover brought in contact with a hydrogen source, most simply with elemental hydrogen.

Variant B: the highly reactive metal hydrides $MH_n*$ are formed partially or completely according to reaction equations (2)-(4), and it is only then that the $MH_n*$ acceptor is added.

The hydrometalation reaction according to Eq. (9) can be accelerated by the addition of catalytically active transition metal compounds. As catalysts, the halogen or alkoxy compounds of the 4th and 5th subgroup of the PTE can be considered, in particular the chlorides of Ti, Zr, Hf, V, Nb, Ta, preferably $TiCl_4$, $ZrCl_4$ and VCl3, as well as metallocene compounds of the mentioned metals such as, for example, $Cp_2TiCl_2$, $CpTiCl_3$, $Cp_2ZrCl_2$, or other complex compounds of the mentioned metals. They are added in quantities from 0.001 to 10 mol %, preferably 0.005 to 5 mol % with respect to metal hydride $MH_n*$.

The invention is explained based on the following examples.

Example 1: Preparation of Active Lithium Hydride LiH* from LiAlH$_4$ and Lithium Powder in THF In a glass flask rendered inert (i.e., heated and filled with argon), 0.29 g (41.8 mmol) of lithium powder ($D_{50}$=approximately 80 µm) were suspended in 50 mL of dry tetrahydrofuran. Then, 13.9 mmol LiAlH$_4$ in the form of an approximately 10% solution in tetrahydrofuran were added by means of a syringe. After a few minutes, the metal had already turned dark; after 20 hours of stirring, a black suspension had formed. The solid formed was isolated using a Schlenk frit under protective gas (argon).

Yield: 0.61 g

An X-ray diffractogram showed that the black solid contains the phases LiH and Al.

Example 2: Preparation of Active Lithium Hydride LiH* from LiAlH$_4$ and Lithium Powder in Et$_2$O In a glass flask rendered inert (i.e., heated and filled with argon), 0.29 g (41.8 mmol) of lithium powder ($D_{50}$=approximately 80 µm) were suspended in 45 mL of dry diethyl ether. Then, 13.9 mmol of LiAlH$_4$ in the form of an approximately 12% solution in diethyl ether were added by means of a syringe. After a few minutes, the metal had already turned dark; after 20 hours of stirring, a black suspension had formed. The solvent was removed by condensation under a vacuum. A powdery, pyrophoric residue remained.

Yield: 0.65 g

An X-ray diffractogram showed that the black solid consists of the phases LiH and Al.

Example 3: Preparation of Active Sodium Hydride NaH* from LiAlH$_4$ and Sodium Powder in THF In a glass flask rendered inert (i.e., heated and filled with argon), 0.96 g (42 mmol) of sodium powder were suspended in 43.7 g of dry tetrahydrofuran. Then, 14.5 mmol of LiAlH$_4$ in the form of an approximately 10% solution in tetrahydrofuran were added by means of a syringe under magnetic stirring. After stirring for approximately 3 hours at RT, the metal turned dark. After a reaction time of 20 hours, the stirrer was turned off, a sample was removed from the upper liquid region, filtered until clear through a membrane syringe filter (0.45 µm) and examined for dissolved hydride activity (by gas volumetry). In the case of decomposition in water, the clear filtered sample developed no significant gas volume, i.e., the soluble AlH$_4^-$ had been converted largely completely to insoluble NaH* and Al.

The black solid formed was isolated and dried.

Yield: 1.32 g (87% of the theory)

Analysis (ICP): Na=27 mmol/g; Al=9.1 mmol/g; Li=9.1 mmol/g

X-Ray Diffractometry:

Sodium hydride, aluminum metal (main products)

Sodium metal, Na$_2$LiAlH$_6$ (secondary components)

Example 4: Preparation of Highly Active LiH* and Addition to B(sec-Bu)$_3$

In a glass flask rendered inert (i.e., heated and filled with argon), 0.31 g (44.7 mmol) of lithium powder (D$_{50}$=approximately 80 µm) were suspended in 20 mL of dry tetrahydrofuran. Then, 13.9 mmol of LiAlH$_4$ in the form of an approximately 10% solution in tetrahydrofuran were added by means of a syringe. After a few minutes, the metal had already turned dark; after stirring for 20 hours, a black suspension had formed.

Then, 43.6 g (55.7 mmol) of B(sec-Bu)3 in the form of a 1 M solution in THF were added within 15 minutes (min) at room temperature. A slight temperature increase (approximately 30-35° C.) was observed. At certain times, solution samples were collected, immediately filtered until clear by means of a membrane filter and examined by $^{11}$B NMR spectroscopy:

| B species content, % | Reaction time | | |
|---|---|---|---|
| | 1 hour | 5 hours | 23 hours |
| Li[HB(sec-Bu)$_3$], doublet $\delta^{11}$B = −5.2 ppm | 79 | 85 | 92 |
| B(sec-Bu)$_3$, $\delta^{11}$B = 85 ppm | 21 | 15 | 8 |

Example 5: Preparation of Highly Reactive LiH* and Addition to R-β-isopinocampheyl-9-borabicyclo[3.3.1]nonanes, R-Alpine-Borane In a 100-mL ISO threaded bottle rendered inert (i.e., heated and filled with argon) with septum closure, 0.155 g (22.3 mmol) of lithium powder (D$_{50}$=approximately 80 µm) were suspended in 30 mL of dry tetrahydrofuran. Then, 7.1 mmol of LiAlH$_4$ in the form of an approximately 10% solution in tetrahydrofuran were added by means of a syringe. Already after a few minutes, the metal had turned dark; after 20 hours of stirring, a black suspension had formed. Then 4.78 g (27 mmol) of R-Alpine-Borane in the form of a 0.5 molar solution in THF were added within 30 min by means of a syringe/syringe pump. Spontaneous heating (in the end approximately 40° C.) was observed. A sample of the reaction mixture was filtered until clear and examined by $^{11}$B NMR.

Alpine-Borane ($\delta^{11}$B=85.3 ppm): not detectable, thus completely reacted LiH addition product ($\delta^{11}$B=−5.4 ppm, doublet): approximately 100%

Example 6: Preparation of Highly Active LiH* with Catalytic LiAlH4 Quantities 0.284 g (40.9 mmol) of lithium powder (D$_{50}$=approximately 80 µm) were filled into a glass flask which had been rendered inert (i.e., heated and filled with argon). The flask was evacuated twice and aerated with hydrogen gas. Via a hose, a connection to a graduated hydrogen reservoir was established. Then, 24.5 g of dry tetrahydrofuran and 2.20 mmol of LiAlH$_4$ in the form of a THF solution were added. Slow magnetic stirring was carried out at RT. After approximately 2 h, the lithium powder had turned black, wherein the consumption of hydrogen gas had started. After 20 hours of stirring, 529 mL (20.2 mmol) of hydrogen had been absorbed from the suspension. This consumption corresponds to 99% of the theory.

The solid formed was isolated using a Schlenk frit.

Yield: 0.29 g

An X-ray diffractogram showed that the black pyrophoric solid contains the phases LiH and Al/Li alloy.

Example 7: Preparation of Active Aluminum from Triethylaluminum and Lithium Metal 0.97 g (140 mmol) of lithium powder (D$_{50}$=approximately 80 µm) were filled into a glass flask which had been rendered inert (i.e., heated and filled with argon). 20 mL of toluene were added, and subsequently, using the canula technique, 187 mmol of triethylaluminum in the form of a 25% solution in toluene were added within 30 min. Stirring was carried out for 5 hours at room temperature. In the process, a black dispersion formed. The reaction mixture was filtered, and the black filter residue was dried in a vacuum.

Yield: 0.87 g (69% of the theory, black powder)

An X-ray diffractometric examination showed that it was Al metal.

The filtrate was examined by $^{27}$Al NMR:

$\delta$=155.9 ppm, h$_{1/2}$=300 Hz (characteristic for LiAlEt$_4$)

The invention claimed is:

1. A method for preparing alkaline earth metal hydrides MH$_2$, characterized in that metals M of second group of the periodic table of elements are reacted with a compound of general formula M$^1_x$[M$^2$(A$^1_y$A$^2_z$)$_{3+x}$]$_b$ or in the presence of finely dispersed, M$^2$ with a mean particle size D$_{50}$ in the range from 0.01 to 100 µm in the presence of hydrogen gas or another source of hydrogen according to

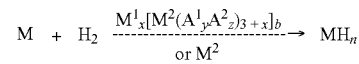

wherein

M$^1$=an alkali metal selected from the group consisting of Li, Na, K, Rb, and Cs, or an alkaline earth metal selected from the group consisting of Be, Mg, Ca, Sr, and Ba, x=0 or 1;

b=the valence of M$^1$;

$M^2$=an element of the 3rd main group of the periodic table of elements, selected from the group consisting of B, Al, Ga, and In;

$A^1$=H or an alkyl group, branched or unbranched, containing 1-18 C atoms, wherein the $A^1$ groups can be identical or different;

$A^2$=an alkoxy residue OR where R=alkyl with 1-8 C atoms, a dialkylamino residue $-NR_2$ where R=alkyl with 1-8 C atoms or a halogen selected from the group consisting of Cl, Br, and I; and y can assume the value 1, 2 or 3, and wherein y+z=3, characterized in that (i) the metals M and the compound are reacted in an aprotic solvent or solvent mixture, wherein at least one of the solvent components is an open-chain or cyclic ether, a tertiary amine or a hydro-carbon, either in pure form or as any mixtures of at least two of the listed solvents, and (ii) the open-chain or cyclic ether is selected from the group consisting of diethyl ether, 1, 2-dimethoxyethane, diethylene glycol dimethyl ether, tetrahydrofuran, 2-methyl tetrahydrofuran, tetrahydropyrane, dioxane, and dioxolane; is a tertiary amine selected from the group consisting of triethylamine, tributylamine, or morpholine; is a hydrocarbon selected from the group consisting of saturated $C_4$-$C_{18}$ hydrocarbons, such as pentanes, hexanes, heptanes, and octanes; or is an aromatic compound selected from the group consisting of benzene, toluene, ethylbenzene, xylenes, and cumene.

2. The method according to claim 1, characterized in that the metals M and the compound are reacted at a temperature in the range between −20 and 150° C.

3. The method according to claim 1, characterized in that the metals and the compound are reacted under $H_2$ atmosphere, wherein $H_2$ pressure is between 1 and 300 bar.

4. The method according to claim 1, characterized in that the compound $M^1_x[M^2(A^1_y A^2_z)_{3+x}]_b$ is used in catalytic quantities from 0.001 to 20 mol %, with respect to the metal M.

5. A method for preparing alkali metal hydrides MH, characterized in that metals M of the first group of the periodic table of elements are reacted in the presence of finely dispersed $M^2$ with a mean particle size $D_{50}$ in the range from 0.01 to 100 μm in the presence of hydrogen gas or another source of hydrogen according to

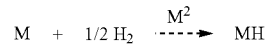

wherein $M^2$=an element of the $3^{rd}$ main group of the periodic table of elements, selected from the group consisting of B, Al, Ga, and In;

characterized in that metal M, and $M^2$ are reacted under $H_2$ atmosphere, wherein $H_2$ pressure is between 1 and 300 bar; and further characterized in that (i) the metal M, and $M^2$ are reacted in an aprotic solvent or solvent mixture, wherein at least one of the solvent components is an open-chain or cyclic ether, a tertiary amine or a hydrocarbon, either in pure form or as any mixture of at least two of the listed solvents, and (ii) the open-chain or cyclic ether is selected from the group consisting of diethyl ether, 1,2-dimethoxyethane, diethylene glycol dimethyl ether, tetrahydrofuran, 2-methyl tetrahydrofuran, tetrahydropyrane, dioxane, and dioxolane; the tertiary amine is selected from the group consisting of trimethylamine, tributylamine, and morpholine; and the hydrocarbon is selected from the group consisting of saturated $C_4$-$C_{18}$ hydrocarbons, wherein the $C_4$-$C_{18}$ are selected from the group consisting of pentanes, hexanes, heptanes, and octanes, or the hydrocarbon is an aromatic compound selected from the group consisting of benzene, ethylbenzene, xylenes, and cumene.

6. The method according to claim 5, characterized in that the metals M and the compound are reacted at a temperature in the range between −20 and 150° C.

* * * * *